United States Patent
Taranath et al.

(10) Patent No.: US 10,063,433 B2
(45) Date of Patent: Aug. 28, 2018

(54) REMOTELY MONITORING NETWORK DIAGNOSTICS

(71) Applicant: Honeywell International Inc., Morristown, NJ (US)

(72) Inventors: Manu Taranath, Bangalore (IN); Deenadayalan Karunakaran, Bangalore (IN); Vamsi Krishna Komanduru, Bangalore (IN); Rajesh V Poojary, Bangalore (IN)

(73) Assignee: Honeywell International Inc., Morris Plains, NJ (US)

(*) Notice: Subject to any disclaimer, the term of this patent is extended or adjusted under 35 U.S.C. 154(b) by 151 days.

(21) Appl. No.: 14/456,103

(22) Filed: Aug. 11, 2014

(65) Prior Publication Data

US 2016/0043914 A1 Feb. 11, 2016

(51) Int. Cl.
*G06F 15/173* (2006.01)
*H04L 12/26* (2006.01)
*H04L 12/24* (2006.01)

(52) U.S. Cl.
CPC .......... *H04L 43/04* (2013.01); *H04L 41/0604* (2013.01); *H04L 43/16* (2013.01); *H04L 43/0852* (2013.01)

(58) Field of Classification Search
CPC ..... H04L 43/04; H04L 12/40; H04L 43/0805; H04L 41/06; H04L 41/0853; H04L 43/16; H04L 41/0869
See application file for complete search history.

(56) References Cited

U.S. PATENT DOCUMENTS

| 6,931,355 | B2 | 8/2005 | Farrell et al. |
| 2003/0135382 | A1* | 7/2003 | Marejka ............ G06F 11/0709 709/232 |
| 2008/0101419 | A1* | 5/2008 | Suriyanarayanan H04L 41/0853 370/503 |
| 2010/0082805 | A1* | 4/2010 | Orton ............ H04L 12/40 709/224 |

(Continued)

FOREIGN PATENT DOCUMENTS

| EP | 1013047 | 6/2000 |
| EP | 2482490 | 8/2012 |
| WO | 98/53581 | 11/1998 |

OTHER PUBLICATIONS

Muller, Andreas, et al. "Collecting Router Information for Error Diagnosis and Troubleshooting in Home Networks", Technische Universit¨ at M¨ unchen, Germany, 6 pgs., Date Accessed: Aug. 6, 2014.

*Primary Examiner* — Philip Chea
*Assistant Examiner* — Mohammed Ahmed
(74) *Attorney, Agent, or Firm* — Brooks, Cameron & Huebsch, PLLC

(57) ABSTRACT

Devices, methods, and systems for remotely monitoring network diagnostics are described herein. One method includes monitoring a control system network of a site for a plurality of diagnostic messages, wherein the diagnostic messages include a set of parameters, collecting diagnostic data associated with the diagnostic messages, correcting a parameter within the set of parameters to conform to a parameter threshold limit, and alerting a user upon the collected diagnostic data having an abnormal parameter within the set of parameters.

19 Claims, 3 Drawing Sheets

(56) References Cited

U.S. PATENT DOCUMENTS

| | | | |
|---|---|---|---|
| 2012/0102184 A1* | 4/2012 | Candelore | H04N 21/4728 709/224 |
| 2012/0153868 A1* | 6/2012 | Gu | H05B 37/0227 315/307 |
| 2013/0227103 A1 | 8/2013 | Garimella et al. | |
| 2013/0274992 A1* | 10/2013 | Cheriere | B64F 5/0081 701/32.9 |
| 2015/0088314 A1* | 3/2015 | Dasari | H05K 7/20836 700/276 |

* cited by examiner

REMOTELY MONITORING NETWORK DIAGNOSTICS

TECHNICAL FIELD

The present disclosure relates to devices, methods, and systems for remotely monitoring network diagnostics.

BACKGROUND

Remote services can offer a manner in which control systems at a site can be monitored remotely and controlled. Successful remote service systems may depend upon the accuracy of the data collected from the remote site and being able to collect the site data without disturbing the site control system network. For example, remote services can include data collection and allow an operator to take control of a remote computer or virtual machine over a network connection.

A remote operator (e.g., a technician, user) of a field site may be responsible for identifying and correcting errors within the system network of the site. In order to perform these tasks, however, a remote operator must rely upon the data provided by the network. The amount of data provided by the network, however, may be substantial or numerous, and/or may include a number of errors which in turn can make it difficult for a remote operator to understand the data and repair the errors.

While collecting the data from the site, there may instances of additional subscriptions, which can add an additional load on the control system network. The additional subscription may lead to slowness or a failure of the control system network. Early detection of control system misbehaviors may assist in the deployment and remote service team to suggest the network loading and data collections based on the control system capability.

In previous approaches, the remote operator may be provided with a tuning mechanism to tune in certain parameters to correct errors or problems within the system. However, in such an approach it may be time consuming and/or difficult for the remote operator to review the data, diagnose the error or problem, and implement a solution.

DETAILED DESCRIPTION

Figure 1:
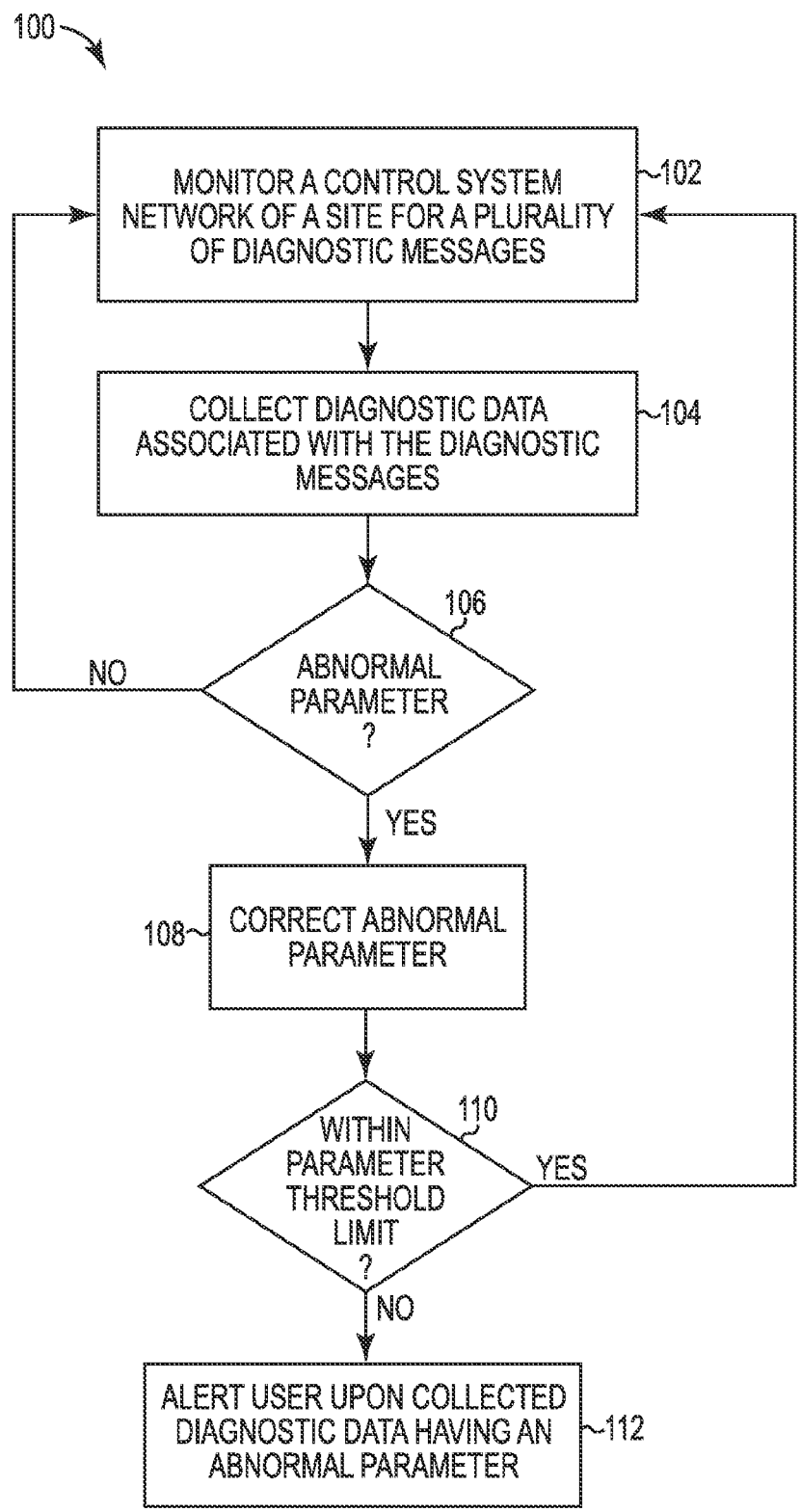
FIG. 1 illustrates a method for remotely monitoring network diagnostics in accordance with one or more embodiments of the present disclosure.

Devices, methods, and systems for remotely monitoring network diagnostics are described herein. For example, one or more embodiments include monitoring a control system network of a site for a plurality of diagnostic messages, wherein the diagnostic messages include a set of parameters, collecting diagnostic data associated with the diagnostic messages, correcting a parameter within the set of parameters to conform to a parameter threshold limit, and alerting a user upon the collected diagnostic data having an abnormal parameter within the set of parameters.

Embodiments of the present disclosure can provide accurate data collection from remote sites, and can collect the data without disturbing the site control system network. Further, embodiments of the present disclosure can provide a mechanism to detect and automatically correct abnormalities, which can improve efficiency and resolve abnormalities prior to developing into a complicated problem. Further, embodiments of the present disclosure can provide a mechanism to detect and alert a remote operator regarding abnormalities, errors, and/or problems that may not be automatically corrected, which can improve identification of abnormalities and further increase efficiency. For example, alerting a remote operator can assist in identifying the problem and allowing remote operator to intervene and correct the detected abnormality.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of components" can refer to one or more components.

FIG. 1 illustrates a method 100 for remotely monitoring network diagnostics in accordance with one or more embodiments of the present disclosure. Method 100 can be performed, for example, by computing device 340 described in connection with FIG. 3.

At block 102, the method 100 includes monitoring (e.g., remotely monitoring) a control system network of a site for a plurality of diagnostic messages. The control system network can include, sensors, controllers, actuators, and a communication network, among other components. The controlled system, actuators, and sensors may not necessarily be co-located, however, the components are connected over a communication network. The communication network connection enables a remotely located computer to operate the system at a remote location. That is, the remotely located computer can connect to the control system network and interact (e.g., operate) the system remotely. Control and feedback signals are exchanged between network components via information packages. In some embodiments, the information packages can include diagnostic messages. The diagnostic messages can include information associated with the control system network, such as field network down time, sub system communication bus overloading, overflow of alarms and events from threshold limits, and/or sub system failures, among other information.

In some embodiments, the diagnostic messages can include a set of parameters (e.g., field parameters) associated with the control system network. The set of field parameters can include information associated with the control system network, such as system configurations. For instance, the set of parameters can include baud rate, polling frequency, change of value delays, and alarm configurations (e.g., hysteresis, dead band), among others.

In some embodiments, the frequency at which the control system network may be polled may be changed (e.g., be increased or decreased). Polling frequency may be modified to collect more or less data/information at a given time period. For example, polling frequency can be increased at a given time to collect more data/information.

In some embodiments, monitoring the control system network includes periodically polling the control system network for the plurality of diagnostic messages. For example, the control system network may be polled at a particular frequency (e.g., rate).

At block 104, the method 100 includes collecting diagnostic data associated with the diagnostic messages. The collected diagnostic data can include information relating to the set of parameters. For example, the collected diagnostic data can include sampling frequency of the points (e.g., signal processing, continuous signal, discrete signal), upload frequency, number of points and/or parameters configured, polling frequency, change of values, and/or baud rate, among other data. Sampling refers to a value or a set of values at a particular period in time and/or space. For instance, sampling frequency at a particular period of time can include signal strength connection, points configured (e.g., signals changed and/or altered), the particular value change associated with the parameter, and/or changes in baud rate (e.g., signaling events). As an additional example, the collected diagnostic data can include the number of points configured, such as the points within the control system network that have changed.

In some embodiments, the diagnostic data can be collected periodically. For example, the diagnostic data can be collected at a particular frequency (e.g., rate), which may be changed (e.g., increased or decreased). The changes can correspond to efficiency settings, operator preference, and/or in response to a related changed setting. For instance, increasing the polling frequency may increase the amount of data gathered, and in response, the gathered data may need to be saved and stored at an increased rate.

In some embodiments, the method 100 can include identifying communication problems associated with the collected diagnostic data. Communication problems can include communication bottlenecks, such as an abundance of messages not being transmitted. A gateway can identify communication bottlenecks based on current communication bus busy messages, device timeouts, receiving (Rx) timeouts, and/or failure of alarms and/or events, among others. Gateways (e.g., servers) can enable remote connections to the field network and share the network connection with other programs. The gateways enable the network connection to send and receive data over the remote connection. For example, diagnostic data can be collected and transmitted from the field network, however, the diagnostic data may be delayed, not delivered, and/or corrupted. The system can identify the communication problems, and once identified, the communication problem can be addressed (e.g., notify the expert, repaired, solved, etc.).

At block 106, the method 100 includes determining whether an abnormal parameter has been detected in the set of parameters. An abnormal parameter can be a parameter that is outside (e.g., exceeds) a threshold limit for the parameter. A parameter threshold limit can be a threshold level (e.g., functionality level) that corresponds to an operating threshold. As an example, an abnormal parameter can include a critical parameter and/or a critical communication error in a subscription. A critical parameter is a parameter that is outside the parameter threshold limit and cannot automatically be changed to fall within the parameter threshold limit.

If an abnormal parameter is not detected, the method 100 can return to block 102 and continue to monitor the control system network of the site for diagnostic messages. If an abnormal parameter is detected, then the method 100, at block 108, can include correcting a parameter within the set of parameters (e.g., the abnormal parameter) to conform to a parameter threshold limit for that parameter. In some embodiments, the parameter can be corrected automatically by the control system network. In some embodiments, the abnormal parameter can be corrected manually by a system operator (e.g., user, technician). For example, an operator can manually change the configuration of a network by changing parameters within the network.

For example, the system may automatically correct an abnormal parameter, or an operator may correct an abnormal parameter. At a different (e.g., future) time, the changed abnormal parameter may not be as efficient, correct, and/or ideal as at the current operating time. The system can be restored to a period (e.g., time, point) prior to when the particular abnormal parameter was changed. Restoring a number of points set prior to an alteration (e.g., reconfiguration) can be beneficial in efficient system operation. The point configurations can be fluid, subsequent configuration (e.g., changes) may not be permanent, which allows for the parameters to change in accordance with system operations. In some embodiments, the configuration changes are done remotely and the configuration can be downloaded to the gateway. For example, an operator (e.g., technician, expert, user) may be alerted to an abnormal parameter. The operator can change the configuration of a parameter remotely, which avoids having to arrive at the physical field site to change parameters.

At block 110, the method 100 includes determining whether the corrected parameter is within the parameter threshold limit. The threshold limit can be based on a lookup table that includes a list of threshold limitations. For example, the threshold limit of an alarm configuration parameter can be based on a lookup table that identifies the threshold limitation. The alarm configuration parameter can then be set to the identified threshold limitation.

In some embodiments, the method 100 includes validating the collected diagnostic data, and/or prioritizing the collected diagnostic data based on a critical status. Validating the collected diagnostic data can include confirming the collected diagnostic data is accurate based on current system settings. Prioritizing the collected diagnostic data can include organizing the collected diagnostic data so that the most important (e.g., urgent) data indicators can be addressed the earliest. For example, the collected diagnostic data may include a number of abnormal parameters. The diagnostic messages that contain abnormal parameters that are severely outside (e.g., exceedingly under or over) the threshold limitation value, can be listed first to establish an order. The abnormalities reported to be present can be validated so as to ensure their existence. Validating the collected diagnostic data can include comparing the collected diagnostic data to past data, the parameter settings, and functionality of the control network system.

At block 112, the method 100 includes alerting a user upon the collected diagnostic data having an abnormal parameter within the set of parameters. Alerting the user can include alerting (e.g., notifying) the user via dashboard, mobile, user interface, or a report. For example, the messages can be can be provided (e.g., displayed and/or presented) to a remote operator (e.g., expert, user technician) associated with the field network. However, embodiments of the present disclosure are not so limited. For example, messages can be provided to any person and/or entity responsible for diagnosing, fixing, and/or resolving abnormalities associated with the field system, and/or any person and/or entity responsible for diagnosing and/or improving field system operations.

In some embodiments, the method 100 can include restoring a number of points, wherein the number of points are set prior to altering the configuration of the field network. Restore points are a specific period of time during which the network was operating in a particular manner. That is, the particular network configuration and the specific parameters were functioning in a particular manner. Restoring the number points can be configured by a user, and a selected point within the number of points can be selected for a system restoration. The restore points can enable the system to return to a former state of functioning prior to a particular parameter change. In some embodiments, restoring the number of points can include one or multiple parameters, such as increasing a polling frequency, increasing the change of value delays, reducing the baud rate, or reducing the number of restore points.

The parameter configuration changes can be completed remotely and a gateway (e.g., server) can download the configurations. In some embodiments, the gateway can identify whether the parameter changes were effective in resolving the threshold limitations and/or the problem.

Figure 2:
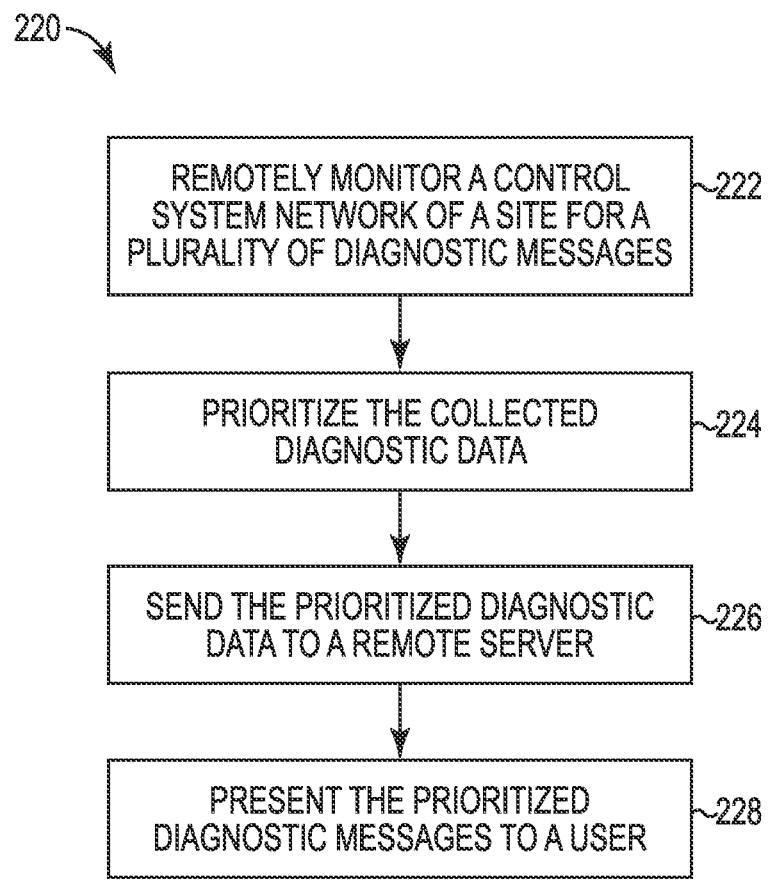
FIG. 2 illustrates a method for remotely monitoring network diagnostics in accordance with one or more embodiments of the present disclosure.

FIG. 2 illustrates a method 220 for remotely monitoring network diagnostics in accordance with one or more embodiments of the present disclosure. Method 220 can be performed, for example, by computing device 340 described in connection with FIG. 3.

At block 222, method 220 includes remotely monitoring a control system network of a site for a plurality of diagnostic messages. The diagnostic messages can include a set of field parameters, and diagnostic data associated with the diagnostic messages can be collected, as previously described herein (e.g., in connection with FIG. 1).

At block 224, method 220 includes prioritizing the collected diagnostic data based on the set of field parameters. Prioritizing the collected diagnostic data can include organizing the collected diagnostic data so that the most important (e.g., urgent) data indicators can be addressed the earliest. In some embodiments, the prioritization of the collected diagnostic messages can be based on a threshold value associated with the field parameters. For example, diagnostic messages that contain parameters severely outside (e.g., exceedingly under or over) the threshold value, can be listed first to establish an order.

The diagnostic data can be prioritized based on the received set of field parameter information. The prioritized set of field parameters can be ordered based on the parameter threshold limitation. A parameter can be corrected to conform to a parameter threshold limit, thus increasing efficiency of the network. A control system network can automatically correct a non-conforming parameter.

At block 226, method 220 includes sending the prioritized diagnostic data to a remote server. The diagnostic data can be prioritized, such as ranking or ordering the diagnostic data, from a most critical to a least critical data point. Prioritized diagnostic data can include parameters and/or diagnostic messages that are outside of the threshold limitation. That is, the network system parameter and/or data operations may not be functioning efficiently. The parameters and/or data operations can be altered to function in a more efficient manner. The prioritized diagnostic data can be sent to the remote server to send and receive information/ data for execution of operations, such as downloading data and/or remotely monitoring the control network site.

In some embodiments, a list of gateways (e.g., servers) can be presented that include the prioritized diagnostic messages to an operator (e.g., user, technician). Gateways can enable remote connections to the field network without having to set up a virtual private network connection. The gateways can enable a connection to the remote field network across firewalls and share the network connection with other programs. The gateway connection can share the diagnostic data with connected computing devices. An operator can remotely monitor and/or control the field network at any given time period.

At block 228, method 220 includes presenting the prioritized diagnostic messages to a user. The user can investigate the diagnostic message and change the parameter configuration as appropriate. In some embodiments, a user can be alerted as to a non-correctable parameter within the set of field parameters. A non-correctable parameter is a critical parameter. For example, a critical parameter is a parameter that the system not automatically changed to fall within a threshold limit. The critical parameter may exceed the threshold limitation to such an extent as to qualify as a problem for the system. Alerting a user (e.g., technician, expert) can notify the proper authority. The user can remotely change the critical parameter and/or manually change the critical parameter.

Configuration changes can be for specific areas, such as part of a network connected to one or more controllers, and/or part of a network based on the type of protocol. A user can change the parameters associated with sampling frequency, upload frequency, change of value delays, among others. The parameter configurations can be done remotely. In addition, the configuration can be downloaded to the gateway remotely.

In some embodiments, the control system network can have a set of restore points prior to parameter configuration changes. The restore points enable a system to return to a former state of functioning prior to a particular parameter change. The restore points can be set to periodically save at designated times, programmed, and/or manually saved.

Figure 3:
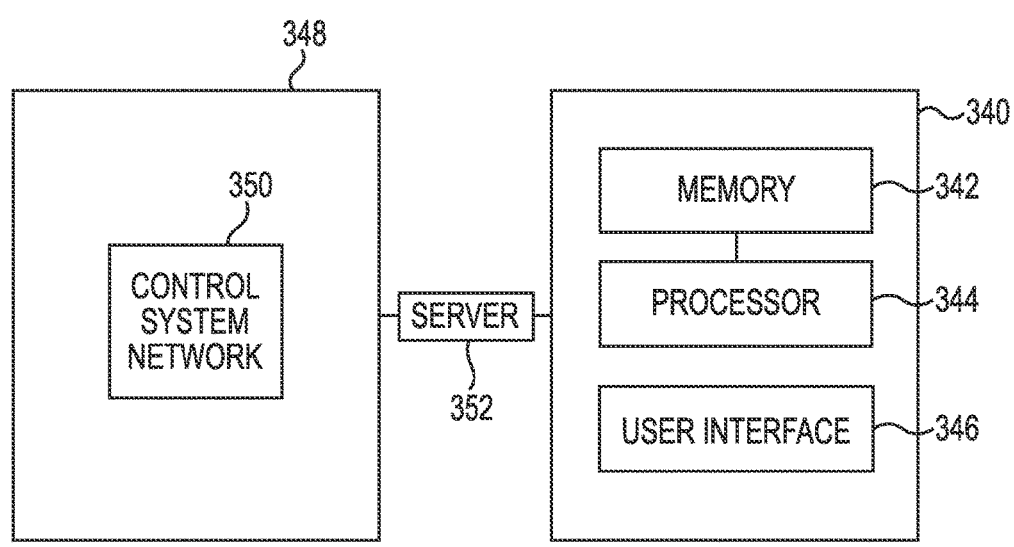
FIG. 3 illustrates a computing device for remotely monitoring network diagnostics in accordance with one or more embodiments of the present disclosure.

FIG. 3 illustrates a computing device 340 for remotely monitoring network diagnostics in accordance with one or more embodiments of the present disclosure. Computing device 340 can be, for example, a laptop computer, a desktop computer, or a mobile device (e.g., a smart phone, a tablet, a personal digital assistant, etc.), among other types of computing devices.

As shown in FIG. 3, computing device 340 can include a memory 342 and a processor 344 coupled to memory 342. Memory 342 can be any type of storage medium that can be accessed by processor 344 to perform various examples of the present disclosure. For example, memory 342 can be a non-transitory computer readable medium having computer readable instructions (e.g., computer program instructions) stored thereon that are executable by processor 344 to remotely monitor network diagnostics in accordance with one or more embodiments of the present disclosure.

Memory 342 can be volatile or nonvolatile memory. Memory 342 can also be removable (e.g., portable) memory, or non-removable (e.g., internal) memory. For example, memory 342 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 342 is illustrated as being located in computing device 340, embodiments of the present disclosure are not so limited. For example, memory 342 can also be located internal to another computing resource (e.g., enabling computer readable instructions to be downloaded over the Internet or another wired or wireless connection).

As shown in FIG. 3, computing device 340 can also include a user interface 346. User interface 346 can include, for example, a display (e.g., a screen). The display can be, for instance, a touch-screen (e.g., the display can include touch-screen capabilities).

User interface 346 (e.g., the display of user interface 346) can provide (e.g., display and/or present) information to a user of computing device 340. For example, user interface 346 can provide an alert to a user upon collected diagnostic data having an abnormal parameter, and/or present prioritized diagnostic messages to a user, as previously described herein. Further, user interface 346 can provide a notification of scheduled and unscheduled timeouts associated with the control system network.

The site 348 (e.g., remote site) can include a control system network 350. The remote server 352 can communicate between the control system network 350 of site 348 and the computing device 340. For example, the remote server 352 can send and receive diagnostic data from the control system network 350 of the site 348 and the computing device 340. For instance, diagnostic data collected from the control system network 350 of site 348 may send a diagnostic message that includes an abnormal parameter. The remote server 352 can send the diagnostic message to the computing device 340, which can be displayed on the user interface 346. An operator (e.g., user, technician) can send data to the control system network to change and/or repair the abnormal parameter. Thus, the computing device 340 can remotely monitor and collect diagnostic data associated with a control system network 350 of a site 348.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer implemented method for remotely monitoring network diagnostics, comprising:
    monitoring a control system network of a site for a plurality of diagnostic messages, wherein the diagnostic messages include a set of parameters;
    collecting diagnostic data associated with the diagnostic messages at a particular frequency, wherein the particular frequency changes to correspond to at least one of efficiency settings, operator preferences, and a related changed setting;
    prioritizing the collected diagnostic data based on a critical status such that diagnostic messages containing abnormal parameters are listed first in an order of the diagnostic messages, wherein an abnormal parameter is a non-critical parameter that is outside a threshold limit for that parameter, and wherein the non-critical parameter is automatically corrected to conform to a parameter threshold limit;
    alerting a user upon the collected diagnostic data having a critical abnormal parameter within the set of parameters, wherein the critical abnormal parameter is a non-correctable parameter; and
    manually correcting the critical abnormal parameter within the set of parameters to conform to the parameter threshold limit in response to alerting the user.

2. The method of claim 1, further comprising determining whether the corrected abnormal parameters are within the parameter threshold limit, wherein the threshold limit is based on a lookup table that includes a list of threshold limitations.

3. The method of claim 1, wherein the set of parameters include at least one of baud rate, polling frequency, change of value delays, and alarm configurations.

4. The method of claim 1, wherein the critical abnormal parameter includes a critical communication error in a subscription.

5. The method of claim 1, wherein monitoring the control system network includes periodically polling the control system network for the plurality of diagnostic messages or network messages.

6. The method of claim 1, further including restoring a number of points, wherein the number of points are set prior to altering the configuration of the field network.

7. The method of claim 6, wherein restoring the number points is configured by a user and a selected point within the number of points is selected for a system restoration.

8. The method of claim 6, wherein restoring the number of points include at least one of increasing a polling frequency, increasing the change of value delays, reducing the baud rate, or reducing the number of restore points.

9. The method of claim 1, further comprising identifying communication problems associated with the collected diagnostic data.

10. The method of claim 1, further comprising validating the collected diagnostic data based on current system settings.

11. The method of claim 1, wherein alerting the user includes alerting the user via dashboard, mobile, user interface, or a report.

12. A non-transitory computer readable medium having computer readable instructions stored thereon that are executable by a processor to:
remotely monitor a control system network of a site for a plurality of diagnostic messages, wherein the plurality of diagnostic messages include a set of field parameters;
collect diagnostic data that includes information relating to the set of field parameters at a particular frequency, wherein the particular frequency changes to correspond to at least one of efficiency settings, operator preferences, and a related changed setting;
manually correct a critical abnormal field parameter to conform to a parameter threshold limit in response to alerting a user to the critical abnormal field parameter, wherein the critical abnormal field parameter is a non-correctable parameter;
prioritize the collected diagnostic data based on the set of field parameters such that diagnostic messages of the plurality of diagnostic messages that contain abnormal parameters are listed first in an order of the diagnostic messages, wherein an abnormal parameter is a non-critical parameter that is outside a threshold limit for that parameter, and wherein the non-critical parameter is automatically corrected to conform to the parameter threshold limit;
send the prioritized diagnostic data to a remote server; and
present the prioritized diagnostic messages to the user.

13. The computer readable medium of claim 12, wherein the prioritization of the collected diagnostic messages are based on a threshold value associated with the field parameters.

14. The computer readable medium of claim 12, wherein the instructions are executable to present a list of gateways that include the prioritized diagnostic messages to the user.

15. A computing device for remotely monitoring network diagnostics, comprising:
a memory; and
a processor configured to execute executable instructions stored in the memory to:
monitor a control system network of a site for diagnostic data at a particular frequency, wherein the particular frequency changes to correspond to at least one of efficiency settings, operator preferences, and a related changed setting, and wherein the diagnostic data includes a set of field parameter information;
prioritize the diagnostic data based on the set of field parameter information such that diagnostic data containing abnormal parameters are listed first in an order of the diagnostic messages, wherein an abnormal parameter is a non-critical parameter that is outside a threshold limit for that parameter, and wherein the non-critical parameter is automatically corrected to conform to a parameter threshold limit;
alert a user to a critical parameter within the set of field parameters, wherein the critical parameter is a non-correctable parameter; and
manually correct the critical abnormal parameter within the set of field parameters to conform to the parameter threshold limit in response to alerting the user.

16. The computing device of claim 15, wherein the processor is configured to execute the instructions to provide a notification of scheduled and unscheduled timeouts associated with the control system network.

17. The computing device of claim 15, wherein the processor is configured to execute the instructions to periodically collect the diagnostic data.

18. The computing device of claim 15, wherein the processor is configured to execute the instructions to set restore points prior to parameter configuration changes.

19. The computing device of claim 15, wherein the processor is configured to execute the instructions to monitor the control system network by polling the control system network at a particular frequency.

* * * * *